United States Patent
Reitmeier et al.

(10) Patent No.: US 9,121,862 B2
(45) Date of Patent: Sep. 1, 2015

(54) METHOD AND DEVICE FOR MEASURING THE ROTATIONAL SPEED OF A TURBOCOMPRESSOR, AND MOTOR VEHICLE

(75) Inventors: Willibald Reitmeier, Hohenschambach (DE); Bernd Siewert, Regensburg (DE); Manfred Weigl, Sinzing/Viehhausen (DE); Andreas Wildgen, Nittendorf (DE)

(73) Assignee: Continental Automotive GmbH, Hannover (DE)

( * ) Notice: Subject to any disclaimer, the term of this patent is extended or adjusted under 35 U.S.C. 154(b) by 36 days.

(21) Appl. No.: 14/110,409

(22) PCT Filed: Apr. 5, 2012

(86) PCT No.: PCT/EP2012/056249
§ 371 (c)(1),
(2), (4) Date: Nov. 13, 2013

(87) PCT Pub. No.: WO2012/136749
PCT Pub. Date: Oct. 11, 2012

(65) Prior Publication Data
US 2014/0053642 A1 Feb. 27, 2014

(30) Foreign Application Priority Data
Apr. 8, 2011 (DE) .......... 10 2011 016 489

(51) Int. Cl.
*G01P 3/481* (2006.01)
*F02D 41/00* (2006.01)
*F02M 35/10* (2006.01)
(Continued)

(52) U.S. Cl.
CPC ............. *G01P 3/481* (2013.01); *F02B 39/16* (2013.01); *F02D 41/0007* (2013.01); *F02M 35/1038* (2013.01); *F02B 29/0406* (2013.01);
(Continued)

(58) Field of Classification Search
CPC .... G01P 3/481; F02B 2039/168; F02B 39/16; F02B 2037/122; F02B 37/12; F02D 41/0007; F02D 2200/0406; Y02T 10/144
USPC ..................................... 73/114.77
See application file for complete search history.

(56) References Cited

U.S. PATENT DOCUMENTS

| 4,830,449 A | 5/1989 | Spillman, Jr. |
| 6,378,306 B2 * | 4/2002 | Koelle et al. ......... 60/605.1 |

(Continued)

FOREIGN PATENT DOCUMENTS

| DE | 100 49 314 | 4/2002 |
| DE | 100 49 314 A1 | 4/2002 |

(Continued)

*Primary Examiner* — Freddie Kirkland, III
(74) *Attorney, Agent, or Firm* — Cozen O'Connor

(57) ABSTRACT

A method and a device for measuring the rotational speed of a turbocompressor, in particular a turbocharger of a motor vehicle. A frequency of pressure pulses generated in the medium the blades or by the shaft of the turbocompressor is measured using high-frequency signal portion of a pressure sensor, and the turbocompressor rotational speed is ascertained from the measured pressure pulse frequency. Furthermore, the charge pressure of the turbocompressor can be ascertained from the low-frequency signal of the pressure sensor so that a single sensor is sufficient for both measurements. The pressure sensor can be arranged in the intake system downstream of the compressor, upstream or downstream of an intercooler.

14 Claims, 1 Drawing Sheet

(51) Int. Cl.
*F02B 39/16* (2006.01)
*F02B 29/04* (2006.01)

(52) U.S. Cl.
CPC ... *F02B2039/168* (2013.01); *F02D 2200/0406* (2013.01); *Y02T 10/144* (2013.01)

(56) References Cited

U.S. PATENT DOCUMENTS

| | | | |
|---|---|---|---|
| 7,380,446 B2 * | 6/2008 | Baeuerle et al. | 73/114.39 |
| 7,937,941 B2 * | 5/2011 | Nau et al. | 60/605.1 |
| 8,312,718 B2 * | 11/2012 | Sun et al. | 60/602 |
| 8,676,534 B2 * | 3/2014 | Serra et al. | 702/151 |
| 2001/0022084 A1 * | 9/2001 | Koelle et al. | 60/602 |
| 2004/0040548 A1 | 3/2004 | Reuss | |
| 2005/0155349 A1 * | 7/2005 | Sugiura et al. | 60/605.1 |
| 2007/0144174 A1 | 6/2007 | Baeuerle et al. | |
| 2008/0149077 A1 | 6/2008 | Nau et al. | |
| 2010/0095670 A1 | 4/2010 | Grzonkowski et al. | |

FOREIGN PATENT DOCUMENTS

| | | |
|---|---|---|
| DE | 10 2005 056 517 A1 | 5/2007 |
| DE | 10 2005 056517 | 5/2007 |
| DE | 10 2008 060 313 A1 | 6/2008 |
| EP | 0 310 236 | 4/1989 |
| EP | 0 310 236 A2 | 4/1989 |
| JP | 2003 240788 | 8/2003 |
| JP | 2003-240788 A | 8/2003 |
| WO | WO 2007/112911 | 10/2007 |
| WO | WO 2007/112911 A1 | 10/2007 |

* cited by examiner

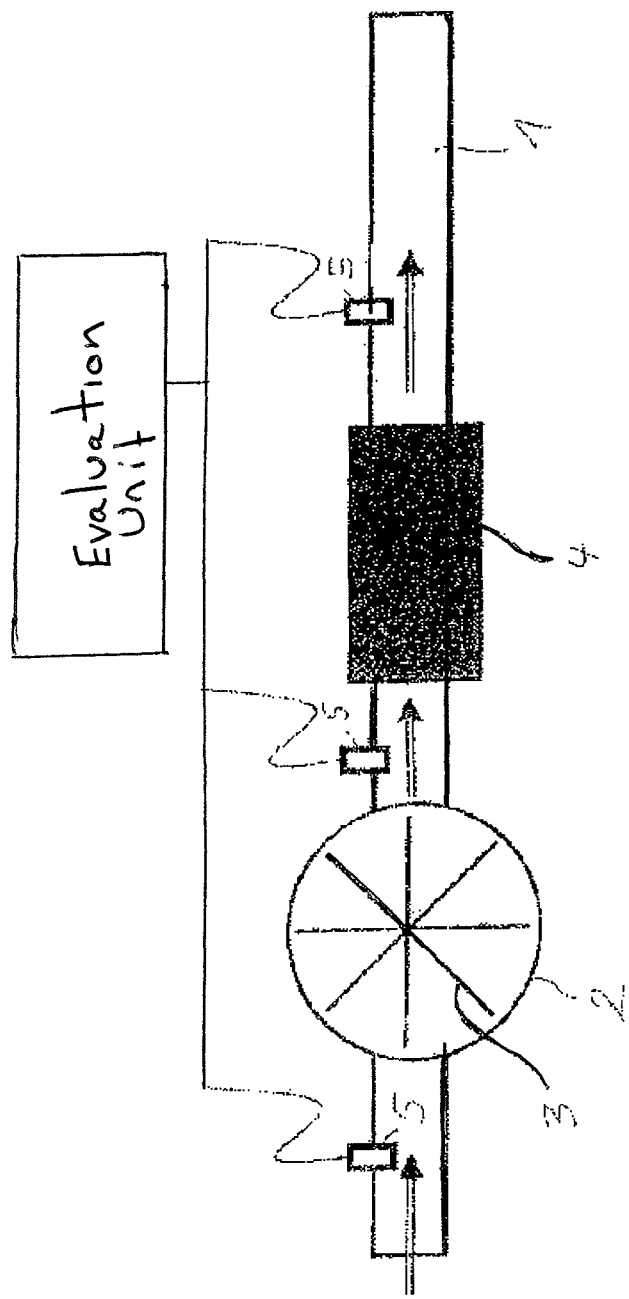

METHOD AND DEVICE FOR MEASURING THE ROTATIONAL SPEED OF A TURBOCOMPRESSOR, AND MOTOR VEHICLE

CROSS REFERENCE TO RELATED APPLICATIONS

This is a U.S. national stage of application No. PCT/EP2012/056249, filed on Apr. 5, 2012. Priority is claimed on German Application No. DE102011016489.8 filed Apr. 8, 2011 the content of which is incorporated herein by reference.

BACKGROUND OF THE INVENTION

1. Field of the Invention

The present invention relates to a method and device for measuring the rotational speed of a turbocompressor, in particular of a turbocharger of a motor vehicle. The invention is also directed to a motor vehicle that has such a device.

2. Description of Prior Art

Nowadays, many motor vehicles are provided with turbochargers that compress the intake air of the internal combustion engine. Such turbochargers run in the normal operating mode of the internal combustion engine without monitoring the rotational speed and/or other specific parameters such as the surge limit, flow separation, and damage to the charger. Owing to this lack of monitoring, malfunctions cannot be detected immediately.

First solutions for remedying this problem exist in that sensors are used that are based on magnetic operational principles (Hall, M R and the like). It is disadvantageous here that both the actual measuring (sensor element) and possible evaluation electronics have to be located in the "hot" region of the turbocharger, with the result that the corresponding components are subjected to high temperatures, which lead to measuring errors and reduce the service life of the components. Furthermore, to a certain extent pre-magnetized components are required, which constitutes a problem both in terms of the expenditure and the service life of the components. In addition, these magnetized parts act negatively as metal particle collectors.

Pressure sensors are used in conjunction with turbochargers to monitor the pressure generated by the turbocharger. For this purpose, piezo-resistive or capacitive sensors are usually used. The sensors are located in the air intake section of the internal combustion engine and measure the pressure of the air compressed by the charger. In order to achieve advantages determined during this pressure measurement in the areas of data processing and signal quality, signal filtering is used. The sensors are cut off, for example, by low pass filtering at approximately 2-10 kHz. Therefore, only signals below this limiting frequency are used for the pressure measurement.

SUMMARY OF THE INVENTION

The present invention is based on providing a method for measuring the rotational speed of a turbocompressor, in particular of a turbocharger of a motor vehicle, which can be implemented particularly cost-effectively with high measuring accuracy.

According to one embodiment of the invention, a frequency of the pressure pulses generated in the medium by the blades or the shaft of the turbocompressor is measured using a pressure sensor system, and the turbocharger rotational speed is determined from the measured pressure pulse frequency.

In the method according to one embodiment of the invention, a pressure sensor is used that is capable of measuring the pressure pulse generated in the medium by the blades or the shaft of the turbocompressor. These are very high frequencies that can be up to 100 kHz and also above this value. According to the invention, operations are therefore preferably carried out with a pressure sensor system without a low pass filtering function.

The turbocompressor rotational speed is determined from the measured pressure pulse frequency of the medium i.e., the compressed air. This may be done, for example, with simple computing operations since the number of blades of the turbocompressor is known. Customary turbochargers have nine to twelve blades on the compressor side.

Preferably, with the method according to one embodiment of the invention, frequency evaluation, for example FFT or DFT, is used for the evaluation.

A simple limiting frequency evaluation can also be operated by simple electronic filtering (bandpass filter, high pass filter, low pass filter) and a comparator function. It may be advantageous here that the upper rotational speed limit is determined and also rotational speeds during the running up of the charger (combined application of various filters in the time domain) are used. This measured frequency/these measured frequencies can be used as a reference point or reference points for determining the compressor parameters. The other variables of the compressor can also be determined in this way, such as the surge limit, flow separation or damage to the compressor.

Of course, with the method according to one embodiment of the invention, a pressure sensor system can be used whose pressure sensor has a suitable evaluation unit for the pressure pulse frequency to be measured.

The method according to one embodiment of the invention has a series of advantages. Existing measurement points for the pure pressure measurement can also be used for the arrangement of the pressure sensors. The measurement with the pressure sensor system does not necessarily have to take place in the direct vicinity of the compressor but can also be carried out at a distance therefrom, i.e. in the cooled region. It is possible to use relatively economical components.

In one embodiment of the method, the pressure generated by the turbocompressor and the rotational speed of the turbocompressor are determined using the same pressure sensor system. In this context, a high frequency signal and a constant portion frequency signal (low frequency signal) are measured and the turbocompressor rotational speed is determined from the high frequency signal via a first evaluation path, and the pressure generated by the turbocompressor is determined from the constant portion frequency signal via a second evaluation path. The advantages of this solution are obvious.

According to one embodiment of the invention, rotational speed measurement is carried out without a separate sensor element and can be implemented using logic modules such as a low pass filter, bandpass filter, high pass filter, and/or comparator.

The present invention also relates to a device for measuring the rotational speed of a turbocompressor, in particular of a turbocharger of a motor vehicle, which is characterized in that said device has a pressure sensor system for measuring the frequency of the pressure pulses generated by the blades or the shaft of the turbocompressor, and an apparatus for determining the turbocompressor rotational speed from the measured pressure pulse frequency. The pressure sensor system used is suitable for picking up or for measuring the corresponding high frequencies (up to 100 kHz and above), in particular a pressure sensor system without a low pass filter function is used. Preferably, the pressure sensor system serves to determine both the pressure generated by the turbocompressor and the rotational speed of the turbocompressor, wherein the pressure sensor system measures a high frequency signal and a constant portion frequency signal (low frequency signal), and the determining device determines the turbo compressor rotational speed from the high frequency signal via a first evaluation path, and the pressure generated by the turbocompressor from the constant portion frequency signal via a second evaluation path.

The pressure sensor system is preferably capable of measuring pressure pulse frequencies up to 100 kHz and above.

In the pressure sensor system it is possible to use a pressure sensor that is provided directly with an evaluation unit for the frequency to be measured. In the pressure sensor system a pressure sensor is preferably used that is provided with an exchangeable evaluation unit for pressure, frequency or both parameters. It is possible to use, for example, a two-chip solution here in which pressure, frequency or both parameters can be determined with one housing application by simply exchanging the evaluation unit.

Finally, one embodiment of the invention relates to a motor vehicle having an internal combustion engine and a turbocompressor, arranged in the air intake section thereof which is characterized in that it has a device of the type described above. The pressure sensor system preferably has here a pressure sensor arranged in the air intake section downstream of the turbocompressor and has the purpose of measuring the pressure pulse frequency. In another embodiment, the pressure sensor system has a pressure sensor arranged in the air intake section downstream of the turbocompressor and a charge air cooler and has the purpose of measuring the pressure pulse frequency. This embodiment has the advantage that the pressure sensor is arranged in the cooled area of the air intake section. The invention does not preclude the possibility of a pressure sensor for measuring the pressure pulse frequency also being able to be arranged upstream of the compressor of the turbocharger in the air intake section.

The invention will be explained in more detail below in detail on the basis of an exemplary embodiment and in conjunction with the drawing. The single FIGURE shows a schematic illustration of an air intake section of an internal combustion engine with a pressure sensor for measuring the pressure pulse frequency.

BRIEF DESCRIPTION OF THE DRAWINGS

The FIGURE is an air intake section of an internal combustion having a turbocharger.

DETAILED DESCRIPTION OF THE PRESENTLY PREFERRED EMBODIMENTS

The FIGURE is a schematic view of the air intake section 1 of an internal combustion engine (not shown) in which the air is conveyed from left to right in the FIGURE, as indicated by the arrows. The compressor of turbocharger 2, which is illustrated only schematically, is located in the air intake section 1. The compressor of turbocharger 2 has eight schematically shown compressor blades 3. Arranged downstream of the compressor 2 is a charge air cooler 4 with which the hot compressed air output by the compressor of turbocharge 2 is cooled.

To measure the rotational speed of the turbocompressor 2, a pressure sensor 5 is provided that is part of the pressure sensor system for measuring the frequency of the pressure pulses generated by the blades 3 of the compressor of turbocompressor 2. The pressure sensor 5 is connected to an apparatus for determining the turbocompressor rotational speed from the measured pressure pulse frequency. This apparatus can be arranged, for example, as an evaluation unit directly on the pressure sensors or separately therefrom. The evaluation unit may determine, for example, only the turbocompressor rotational speed or else the turbocompressor rotational speed and the turbocompressor pressure.

The pressure sensor 5 is illustrated at three possible arrangement points in the FIGURE. It can be arranged upstream of the compressor 2, downstream of the compressor 2 or upstream of the charge air cooler 4 in the air conveying direction or else can be arranged in contact with the conveyed medium (air) downstream of the charge air cooler 4 in the air intake section 1. The arrangement downstream of the charge air cooler 4 has the advantage that the pressure sensor is arranged in a cooled area.

During operation, the frequency of the pressure pulse is generated by the blades 3 of the turbocompressor 2 is measured, and the turbocompressor rotational speed is determined from this frequency value. This can be carried out at specific time intervals or else continuously as a monitoring measure.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for measuring a rotational speed of a turbocompressor of a turbocharger, comprising:
    measuring a frequency of pressure pulses generated in a medium by at least one of a blades or a shaft of the turbocompressor using a pressure sensor arranged one of upstream of the turbocompressor and downstream of a cooler; and
    determining the turbocompressor rotational speed from the measured pressure pulse frequency,
    wherein the frequency measurements are carried out during a running up of the turbocharger and the rotational speed is determined from the frequency measurements, and
    wherein the measured frequencies are reference points for determining turbocharger parameters.

2. The method as claimed in claim 1, wherein the measuring is performed by a pressure sensor system without a low-pass function.

3. The method as claimed in claim 2, further comprising:
    determining a pressure generated by the turbocompressor, wherein the pressure generated by the turbocompressor and the rotational speed of the turbocompressor are determined using a same pressure sensor system.

4. The method as claimed in claim 1, further comprising:
    determining a pressure generated by the turbocompressor, wherein the pressure generated by the turbocompressor and the rotational speed of the turbocompressor are determined using a same pressure sensor system.

5. The method as claimed in claim 4, further comprising:
measuring a high-frequency signal and a constant portion low frequency signal;
determining the turbocompressor rotational speed based on the high frequency signal via a first evaluation path; and
determining the pressure generated by the turbocompressor based on the constant portion frequency signal via a second evaluation path.

6. A device for measuring a rotational speed of a turbocharger compressor, comprising:
a pressure sensor system arranged one of upstream of the turbocompressor and downstream of a cooler, and configured to measure a frequency of pressure pulses generated by one of blades or a shaft of the turbocompressor; and
an apparatus configured to determine the turbocompressor rotational speed based on the measured pressure pulse frequency,
wherein the pressure sensor system is configured to perform the frequency measurements during a running up of the turbocharger, and
the device is configured to determine the turbocompressor rotational speed from the frequency measurements.

7. The device as claimed in claim 6, further comprising a pressure sensor system without a low pass function.

8. The device as claimed in claim 7, wherein the pressure sensor system is used to determine a pressure generated by the turbocompressor and the rotational speed of the turbocompressor.

9. The device as claimed in claim 8, wherein
the pressure sensor system is configured to measure a high frequency signal and a constant portion low frequency signal, and
the device determines the turbocompressor rotational speed from the high frequency signal via a first evaluation path and the pressure generated by the turbocompressor from the constant portion frequency signal via a second evaluation path.

10. The device as claimed in claim 7, wherein the pressure sensor system is configured to absorb pressure pulse frequencies up to 100 kHz and above.

11. The device as claimed in claim 7, wherein the pressure sensor has a replaceable evaluation unit for at least one of pressure parameters and frequency parameters, and wherein the replaceable evaluation unit is used in the pressure sensor system.

12. A motor vehicle comprising:
an internal combustion engine;
a turbocompressor of a turbocharger arranged in an air intake section of the internal combustion engine;
a cooler arranged downstream of the turbocompressor; and
a device configured to measure a rotational speed of the turbocompressor, comprising:
a pressure sensor system arranged one of upstream of the turbocompressor and downstream of the cooler and configured to measure a frequency of pressure pulses generated by one of blades or a shaft of the turbocompressor; and
an apparatus configured to determine a turbocompressor rotational speed based on the measured pressure pulse frequency,
wherein the pressure sensor system is configured to carry out the frequency measurements during a running up of the turbocharger, and the device is configured to determine the turbocompressor rotational speed from the frequency measurements.

13. The motor vehicle as claimed in claim 12, wherein the pressure sensor system has a pressure sensor configured to measure the pressure pulse frequency and is arranged in the air intake section downstream of the turbocompressor of the turbocharger.

14. The motor vehicle as claimed in claim 12, wherein the pressure sensor system has a pressure sensor configured to measure the pressure pulse frequency and arranged in the intake air section downstream of the turbocompressor of the turbocharger and downstream of a charge air cooler.

* * * * *